United States Patent

[11] 3,615,229

[72] Inventors Paige K. Besch
   Houston, Tex.;
   Nicholas Vorys, Columbus, Ohio
[21] Appl. No. 827,955
[22] Filed May 26, 1969
[45] Patented Oct. 26, 1971
[73] Assignee Searle Reference Laboratories, Inc.

[54] USE OF OXALIC ACID FOR THE HYDROLYSIS OF STEROID CONJUGATES IN PREGNANCY ANALYSIS
11 Claims, No Drawings

[52] U.S. Cl. .................................................. 23/230 B
[51] Int. Cl. ............................................... G01n 33/16
[50] Field of Search ......................................... 23/230

[56] References Cited
UNITED STATES PATENTS
3,520,658  7/1970  Anyanwu .................. 23/230 B Primary Examiner—Morris O. Wolk
Assistant Examiner—R. M. Reese
Attorney—Fay, Sharpe and Mulholland ABSTRACT: A method for the determination of pregnancy estrogen concentrations by hydrolysis and/or cleavage of conjugated steroids found in urine by treatment with organic acids. The urine of a pregnant woman contains "placental estriols" that may be hydrolyzed with oxalic acid to liberate estrogens. The liberated estrogens are extracted into an organic solvent, which may be compared with standard concentrations of estriol by known colorimetric methods.

USE OF OXALIC ACID FOR THE HYDROLYSIS OF STEROID CONJUGATES IN PREGNANCY ANALYSIS

BACKGROUND OF THE INVENTION

The sterols comprise a vast group of naturally occurring substances which are derivatives of a parent hydrocarbon, cyclopentanoperhydrophenanthrene:

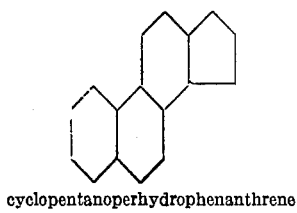

cyclopentanoperhydrophenanthrene

The term steroid has been adapted for a large number of chemically related derivatives of the cylcopentanoperhydrophenanthrene nucleus which include, in addition to other classes of compound, the sterols. The principle animal steroid is cholesterol:

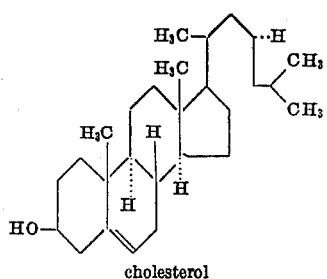

cholesterol

Compounds which are chemically related to cholesterol are designated steroids according to R. K. Callow and F. G. Young, *Proc. Roy. Soc.* 157 A, 194 (1936). Four specific examples of compounds of steroid nature are:

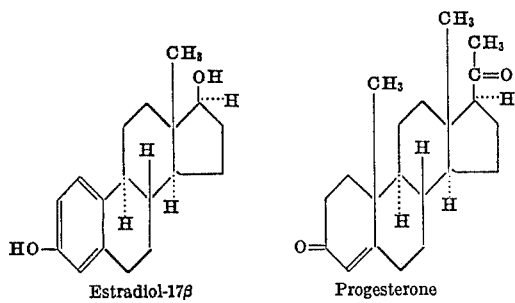

Estradiol-17β     Progesterone

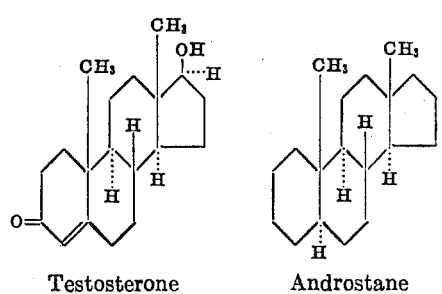

Testosterone     Androstane

The chemistry of the steroids is well known and they play an important roll in life processes. General information concerning steroids is available in texts such as G. L. Jenkins W. H. Hartung, K. E. Hanlin, Jr. and J. B. Data, *Chemistry of Organic Medicinal Products* (4th ed. 1957); and J. S. Fruton, S. Simmonds, *General Biochemistry* (2d ed. 1961).

The steroid hormones are classified into several groups (estrogens, androgens, etc.) depending on their physiological effects which, in turn, depend on their chemical structure. In mammals, steroids are produced by the adrenals, gonads, placenta and fetal tissues. Steroids appear in the urine as the free steroid or in a conjugated (combined) form. The conjugated form results from the interaction of free steroids with a conjugating agent. Some chemical agents capable of conjugation with the steroid are phosphoric sulfuric and glucuronic acids.

Most of the steroids in the urine are present in the form of a conjugated derivative which is not extractable with common organic chemical solvents. Certain methods for the determination of steroid concentrations involve, necessarily, a release of the steroid from its conjugating agent by hydrolysis (i.e., cleavage of the bond between the steroid and its conjugating agent). This hydrolysis step cleaves the bond between the conjugating agent and steroid and, therefore, releases the free steroid. The free steroid is soluble in certain organic solvents such as ether, ethyl acetate and chloroform. Thus, the hydrolysis procedure serves to free the steroid and allows it to be extracted from the aqueous (urine) sample into the selected organic solvent. Hence, it can be removed from the biological fluid.

Hydrolysis has, in the prior art, been accomplished by the use of the combination of strong mineral acids such as sulfuric or hydrochloric acids and heat. Inherent in hydrolysis by the use of strong mineral acids is the danger of chemical transformations to the steroid which may produce a derivative incapable of responding to the analytical method.

Attempts at using less severe hydrolytic procedures, such as solvolytic or enzymatic methods, have the disadvantage of extensive time requirements for analysis. The use of an enzymatic method also introduces a cost disadvantage. Additionally, in commercial steroid analysis kits which can be shipped to hospital or private laboratories, the shipping restrictions on the strong mineral acids used for the hydrolysis step and the danger of spillage during shipping present additional undesirable factors.

This invention proposes a new and unique method of hydrolyzing the steroid without the use of strong mineral acids involving the use of the fairly strong crystalline dicarboxylic acid, oxalic acid ($pK_1=1.42$, $pK_2=4.31$). Advantages of the use of oxalic acid for the purpose of hydrolyzing the steroid over strong mineral acids are:

1. The Absence of Artifact Formation

For example, reactions of the following nature are eliminated:

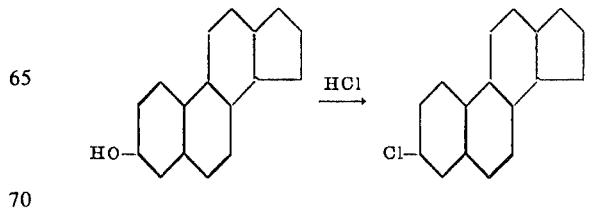

In this example the formation of a 3β-chloro analog is possible if hydrochloric acid is used for the hydrolysis step.

2. The Absence of Undesirable Chemical Transformations

Gross Degradation of the Steroid

It is possible that the combination of heat and mineral acids could cause the destruction of the steroid nucleus.

3. Speed of Analysis

Approximately four hours is required for a determination. Enzymatic or solvolytic methods for hydrolysis would require longer periods of time for analysis.

4. Shipping Convenience

Shipping restrictions applicable to sulfuric and hydrochloric acids would not be applicable to oxalic acid.

5. Shipping Safety

In the event of damage to the shipped steroid analysis kit, personnel would be exposed to a relatively nontoxic powder instead of a dangerous mineral acid.

6. Analytical Convenience

An analytical laboratory could obviate the need for a fume hood if the practically nontoxic oxalic acid were used. In addition, the personnel would not have to be exposed to the dangerous mineral acid fumes. The method of hydrolysis using oxalic acid is very accurate, inexpensive, and faster than safe enzymatic or solvolytic methods.

SUMMARY OF THE INVENTION

This invention, then, proposes the use of oxalic acid as a means of hydrolyzing conjugated steroids to give a free steroid which can be extracted from the biological fluid and analyzed by a suitable chemical method.

PREFERRED EMBODIMENT

It has been shown that during pregnancy, while all estrogens rise somewhat, there is an overwhelming increase in estriol, particularly during the third trimester, which exceeds any quantity that could be attributed to maternal secretion. Recent studies have shown that the large quantity of estriol excreted in the maternal urine is a result of the placental conversion to estriol of 16-OH dehydroepiandrosterone, which is secreted by the fetal adrenal. It is this phenomenon which makes the determination of "placental estriol" one of the best indices of the well-being of the fetal-placental complex.

Although methods are available which are specific for estriol, it is more convenient to measure the total estrogens. The estriol-specific methods are more complicated and lengthy than the total estrogen technique. Since rapid return of the data to the clinician is frequently imperative, this invention is designed to measure total estrogens in a relatively short period of time.

Urinary estrogens are consistently decreased in pregnancies complicated with maternal diabetes, toxemia of pregnancy, and premature placental senescence. New developments in extraction of the Kober chromogens from the nonspecific chromogens, which previously have plagued the analyst, have made it possible to detect quantities heretofore impossible in small amounts of urine.

In general a description of the instant invention is as follows. A milliliter aliquot of a 24 hour urine specimen containing a steroid conjugate is hydrolyzed optionally in the presence of a salt with crystalline oxalic acid which dissolves upon heating, and recrystallizes again upon cooling. The liberated estrogens (estriol comprising over 95 percent of the total) are extracted into a solvent, an aliquot of which is transferred to a color tube and dried. Known quantities of estriol are pipetted into identical tubes and the color developed, extracted, and compared in a spectrophotometer at various wavelengths, making use of the Allen Correction to minimize the background effect.

One or more of the following steroid conjugates, which may be present in the urine of a pregnant woman can be hydrolyzed with oxalic acid to yield the beneficial results of the invention:

STEROID CONJUGATES

Estra-1,3,5(10)-trien-17-one-3-yl sulfate
Estra-1,3,5(10)-trien-17$\beta$-ol-3$l$ sulfate
Estra-1,3,5(10)-trien-3,17$\beta$-diyl sulfate
Estra-1,3,5(10)-trien-16$\alpha$,17$\beta$-diol-3-yl sulfate
Estra-1,3,5(10)-trien-17-one-3-yl$\beta$-D-glucopyrahosiduronic - D-glucopyranosiduronic acid
Estra-1,3,5(10)-trien-3,17$\beta$-diol-$\alpha$-yl$\beta$-D-glucopyranosiduronic acid
Estra-1,3,5(10)-trien-3,16$\alpha$-diol-17$\beta$-yl$\beta$-D-glucopyranosiduronic acid
Estra-1,3,5(10)-trien-17$\beta$-ol-3,16$\alpha$-diyl$\beta$-D-glucopyranosiduronic acid
Estra-1,3,5(10)-trien-16$\alpha$-ol-3-yl sulfate-17$\beta$-yl$\beta$-D-glucopyranosiduronic acid
Estra-1,3,5(10)-trien-17$\beta$-ol-3,16$\alpha$-diyl sulfate
Androstan-5-en-17-one-3$\beta$-yl sulfate
5$\beta$-Androstan-17-one-3$\beta$-yl sulfate
5$\alpha$-Androstan-17-one-3$\alpha$-yl sulfate
Androstan-5-en-17-one-3$\beta$-yl$\beta$-D-glucopyranosidurmic acid
5$\beta$-Androstan-17-one-3$\alpha$-yl$\beta$-D-glucopyranosidurmic acid
5$\beta$-Androstan-17-one-3$\alpha$-yl$\beta$-D-glucopyranosiduramic acid
Androstan-4en-3-one-17$\beta$-yl$\beta$-D-glucopyranosidurmic acid
17$\alpha$21-dihyrdroxy-5$\beta$-pregnan-11,20-dione-3$\alpha$-yl$\beta\beta$-D-gluocopyranosidurmic acid
11$\beta$,17$\alpha$,21-trihydroxy-5$\beta$-pregnan-20-one-3$\alpha$-yl$\beta$-D-glucopyranosidurmic acid
3$\alpha$,17$\beta$,17$\alpha$-trihydroxy-5$\beta$-pregnan-20 -one-21-yl$\beta$-D-glucopyranosidurmic acid In each case hydrolysis with oxalic acid provides a free steroid or estrogen capable of colorimetric analysis by the measurement of total estrogen concentration.

APPLICATION ON PREGNANCY DETERMINATIONS

The reaction between the aforesaid steroids contained in the urine of a pregnant woman with oxalic acid according to the method of this invention should be conducted at the boiling point of the hydrolysis solution. In the test procedure outlined, the hydrolysis solution will contain 1 gram of oxalic acid and 200 milligrams of sodium chloride. The boiling temperature in most cases, depending upon atmospheric pressure and other variables, will be between 90° centigrade and 110° centigrade. The most preferred temperature range being approximately 95° to 100° centigrade.

The ratio of dry, crystalline oxalic acid to other satisfactory acid to urine sample will vary from approximately 1/2 gm. per ml. to 2 gm. per ml. The time for heating the acid and conjugated steroid hydrolysis sample in order to complete the hydrolysis reaction will usually vary between 20 minutes and 120 minutes. The following is an illustration of a step-by-step technique for using the invention to determine estrogen concentrations in urine:

EXTRACTION

1. Add Urine. To hydrolysis tube containing 200 mg. NAC1 and 1 gm. oxalic acid, add 1.0 ml urine, cap, punch pinhole in cap.
2. Boil 1 hour. Mix several times during the first few minutes to dissolve acid crystals.
3. Cool SLOWLY to room temperature so that large crystals form. (Incline tube so that crystals form on the side of the tube instead of the bottom.)
4. Add Extraction Solvent (dichloromethane). Add 10.0 ml of the Extraction Solvent to the cooled tube.
5. Cap again, place finger over pinhole and shake vigorously for 30 seconds.
6. Spin in centrifuge until solvent is clear.
7. Aspirate urine from solvent.
8. Transfer 5.0 ml of solvent from the specimen tube to a color tube.
9. Pipette 0.5 and 1.0 ml STANDARD SOLUTION (10 $\mu$ g./ml. of estriol) into 2 other color tubes.
10. Dry the 3 tubes. Evaporate the 3 color tubes to dryness.

COLOR DEVELOPMENT

1. Add Reagent. To each color tube, add 1.5 ml. of COLOR REAGENT (sulfuric acid containing hydroquinone). Mix.

2. Boil 20 minutes, mixing twice again during the first 6 minutes.
3. Cool in a cold water bath.
4. Add water, 0.5 ml. distilled water to each tube. Mix.
5. Replace in boiling bath for 10 minutes.
6. Chill in ice bath.

COLOR EXTRACTION

1. Add Solution 1. Add 1.2 ml. of COLOR EXTRACTION SOLUTION 1; (2N trichloroacetic acid) Shake 15 seconds and return to ice bath for 2 minutes.
2. Add Solution II. Add 3.0 ml. of COLOR EXTRACTION SOLUTION II; (chloroform) Shake 15 seconds, gently.
3. Spin 2 minutes. Aspirate upper layer and pour lower layer into cuvettes. Read against distilled water at 504, 534, 564 mu.

The following reactions are illustrated as typical examples of the hydrolysis reactions of this invention:

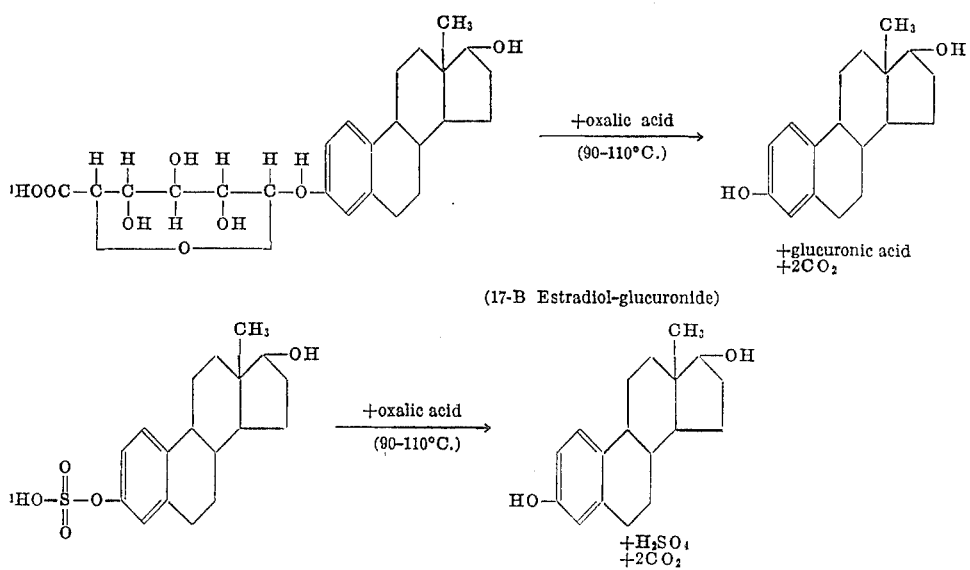

[1] $H^+$ could also be a monovalent metal such as Na or K.

mg. of pure solid estriol is contained and mixed with 20 ml. of pure ethyl alcohol.

Thereafter, color development and color extractions are run so that the standard estriol solutions may be compared to the specimen of estriol that is yielded from the urine sample. The spectrophotometric readings are taken at 532–534 mm, and at 504 mm. and 564 mu on a Hitachi-Perkin-Elmer spectrophotometer. The 504 and 564 readings are taken, averaged and subtracted from the 532–534 peak reading.

The Kober method of colorimetric analysis is well known and the Ittrich modification was published in 1959.

Calculations for 24 hour specimen as to actual concentration of estriol in the specimen urine may be calculated according to the following:

CALCULATIONS FOR 24 HOUR SPECIMEN

1. $$A_{534}\ mu. - \frac{A_{504}\ mu. + A_{564}\ mu.}{2} = CA$$

EXAMPLE

One ml. of a 24 hour urine sample of a female human who is known to be in the third trimester of pregnancy is added to a test tube containing one gram of oxalic acid and 200 milligrams of sodium chloride. The contents of this test tube are boiled for 1 hour at 100° centigrade. During this boiling, of the sample, the contents of the tube are mixed several times during the first few minutes to dissolve the acid crystals. Subsequently, to the 1-hour boiling time, the sample is cooled slowly to room temperature so that large crystals form on the side of the tube rather than the bottom of the tube. Thereafter, 10 ml. of dichloromethane is added.

For the extraction solvent dichloromethane may be used or some equivalent solvent such as chloroform, diethyl ether or ethyl acetate.

The sample is mixed thoroughly with the extraction solvent by shaking vigorously for 30 seconds. The sample is then spun in a centrifuge until the solvent is clear. The urine is then aspirated from the solvent.

At this point 5 ml. of specimen solvent is transferred from the specimen tube to a color tube. For purposes of comparison, 0.5 and 1.0 ml. standard solution of estriol are added to two other color test tubes. The concentration of the standard estriol solution should be approximately 10 mg./ml. In the preferred method of making up a standard solution, 200

2. $$\frac{CA\ unk.}{CA\ std.} = \frac{Concentration\ unk.}{Concentration\ std.} (in\ ug./tube)$$

3. $$\frac{ug./tube \times 2 \times T.V.}{1000} = mg./T.V.$$

Where

| | |
|---|---|
| A. = Absorbance | mg. = milligram |
| CA = Corrected Absorbance | unk. = unknown |
| mµ = millimicrons | std. = standard |
| µg. = microgram | T.V. = Total 24 hour volume in ml. |

In this example the mg./T.V. was 14.4, which is an average estriol concentration for a woman in the third trimester.

CALCULATIONS FOR SINGLE VOIDED SPECIMENS

The laboratory which is set up to determine creatinine in urine can speed the data to the physician by performing both an estriol and a creatinine determination on a single voiding of urine and expressing the result as an estrogen/creatinine ratio (Dickey et al., Am. J. Obst. & Gynec., 94, 591, 1966).

1. Calculate mg. estrogens as above and express as mg./T.V.

2. Measure and calculate creatinine in specimen and express as grams/T.V.

3. $\text{Ratio E/C} = \dfrac{\text{mg. estrogen/T.V.}}{\text{grams creatinine/T.V.}}$ It should be noted that this estrogen method, as well as most other total pregnancy estrogen methods, cannot be relied upon at low estrogen levels and it is not intended for low level detection in normal nonpregnant patients.

In normal pregnancies, estrogens rise from less than 50 mg./24 hours to the milligram level as pregnancy progresses, reaching a level of 8 mg. or higher as the third trimester is entered, rapidly rising to levels as high as 50 mg./24 hours at term. The diagnostic significance of the hydrolysis reaction of this invention lies in its relationship to the status of the developing feto-placental unit. A value which drops progressively during the third trimester predicts impending fetal distress and may indicate that an early delivery by caesarean section is necessary to prevent fetal demise. The laboratory should note carefully all values on a given patient which decline steadily, especially when the values fall below 12 mg./24 hours, reporting these values to the physician at once.

It will also be understood that the foregoing description is merely illustrative of the invention, and that various changes in the techniques, conditions, proportions, compositions, and other factors set forth may be made without departing from the spirit of the invention as defined in the appended claims.

The claims:

1. The method of determining the concentration of total estrogens present in the urine of a pregnant female, which comprises:
   a. mixing the female's urine that contains conjugated estrogens with oxalic acid to form a hydrolysis sample;
   b. boiling the hydrolysis sample for a period of time sufficient to hydrolyze all estrogens present;
   c. separating the urine from the estrogen compounds and
   d. quantitatively determining the concentration of estrogens present.
2. The method of claim 1 wherein the estrogens present are conjugates of an estrogen and an acid selected from the group consisting of phosphoric, sulfuric and glucuronic acids.
3. The method of claim 1 wherein the boiling time varies from 20 minutes to 120 minutes.
4. The method of claim 1 wherein the ratio of dry, crystalline oxalic acid to urine sample varies from approximately 1/2 gm. per ml. to 2 gm. per ml.
5. The method of claim 1 wherein a solvent for the estrogens is admixed with the sample after boiling.
6. The method of claim 5 wherein the solvent is selected from the group consisting of dichloromethane, chloroform, diethyl ether and ethyl acetate.
7. The method of claim 1 wherein boiling of the hydrolysis sample is conducted at a temperature range of 90°–110°C.
8. The method of claim 1 wherein hydrolysis takes place in the presence of a salt.
9. The method of claim 8 wherein the salt is sodium chloride.
10. The method of making a colorimetric determination of total hydrolyzed steroids in the urine of a pregnant female comprising the steps of:
    a. collecting a 24-hour urine specimen;
    b. adding a 1 ml. aliquot of said specimen to 200 mg. of sodium chloride and 1 gram of oxalic acid to form a hydrolysis sample;
    c. boiling the hydrolysis sample for a period of time adequate to hydrolyze all conjugated steroids contained in the urine specimen;
    d. adding a solvent to extract the hydrolyzed steroids;
    e. mixing the extraction solvent and hydrolyzed steroid sample;
    f. separating urine from the solvent containing dissolved hydrolyzed steroids;
    g. making up a standard solution of estriol in a solvent and adding color developments fluids thereto;
    h. making a colorimetric comparison between the known concentration of estriol and the hydrolyzed steroids in solution.
11. The method of hydrolyzing a steroid conjugate comprising:
    a. mixing a steroid conjugate in aqueous solution with oxalic acid;
    b. boiling the mixture for a period of time sufficient to hydrolyze the steroid conjugate.

UNITED STATES PATENT OFFICE
CERTIFICATE OF CORRECTION

Patent No. 3,615,229          Dated October 26, 1971

Inventor(s) Paige K. Besch and Nicholas Vorys

It is certified that error appears in the above-identified patent and that said Letters Patent are hereby corrected as shown below:

Column 3, line 75, "-31" should be -- -3-yl --.

Column 4, line 3, "-ylβ" should be -- -yl β --.

Column 4, line 3, "-glucopyrahosiduromic" should be -- -glucopyranosiduronic --.

Column 4, line 4, delete "D-glucopyrano=siduronic."

Column 4, line 5, "diol-α-ylβ" should be --diol-16α-yl β--.

Column 4, line 7, "ylβ" should be -- yl β --.

Column 4, line 9, "diylβ" should be -- diyl β --.

Column 4, line 11, "ylβ" should be -- yl β --.

Column 4, line 15, - delete.

Column 4, line 17, "ylβ" should be -- yl β --.

Column 4, line 18, "ylβ" should be -- yl β --.

UNITED STATES PATENT OFFICE
CERTIFICATE OF CORRECTION

Patent No. 3,615,229  Dated October 26, 1971

Inventor(s) Paige K. Besch and Nicholas Vorys

It is certified that error appears in the above-identified patent and that said Letters Patent are hereby corrected as shown below:

Column 4, line 19, "5β" should be -- 5α --.

Column 4, line 19, "yl β" should be -- yl β --.

Column 4, line 20, "yl β" should be -- yl β --.

Column 4, line 21, "17α21-dihyrdroxy" should be -- 17α 21-dihydroxy --.

Column 4, line 22, "yl ββ-D-" should be -- yl β-D --.

Column 4, line 23, "yl β" should be -- yl β --.

Column 4, line 19, "glucopyranosiduramic" should be -- glucopyranosidurmic --.

Column 4, line 43, "to" should be -- or --.

Column 5, line 16, "mu" should be -- $m_\mu$ --.

Column 5, line 74, "mg" should be -- $\mu g$ --.

Column 6, line 1 "mg" should be -- $\mu g$ --.

Column 6, line 6, "mm" should be -- $m_\mu$ --.

Column 6, line 7, "504 mm. and 564 mu" should be -- 504 $m_\mu$ and 564 $m_\mu$ --.

Column 6, line 17, 3 locations "mu" should

UNITED STATES PATENT OFFICE
CERTIFICATE OF CORRECTION

Patent No. 3,615,229  Dated October 26, 1971

Inventor(s) Paige K. Besch and Nicholas Vorys

It is certified that error appears in the above-identified patent and that said Letters Patent are hereby corrected as shown below:

be -- $m_\mu$ --.

Column 6, line 50, "ug" should be -- $\mu g$ --.

Column 6, line 54, "ug" should be -- $\mu g$ --.

Signed and sealed this 18th day of July 1972.

(SEAL)
Attest:

EDWARD M. FLETCHER, JR.  ROBERT GOTTSCHALK
Attesting Officer  Commissioner of Patents